(12) United States Patent
Evans et al.

(10) Patent No.: US 11,698,096 B2
(45) Date of Patent: Jul. 11, 2023

(54) T-NUT

(71) Applicant: Edge-Works Manufacturing Company, Burgaw, NC (US)

(72) Inventors: Scott V. Evans, Jacksonville, NC (US); Nicholas Tomczak, Richlands, NC (US)

(73) Assignee: Edge-Works Manufacturing Company, Burgaw, NC (US)

( * ) Notice: Subject to any disclaimer, the term of this patent is extended or adjusted under 35 U.S.C. 154(b) by 240 days.

(21) Appl. No.: 16/935,904

(22) Filed: Jul. 22, 2020

(65) Prior Publication Data

US 2021/0025425 A1    Jan. 28, 2021

Related U.S. Application Data

(60) Provisional application No. 62/876,823, filed on Jul. 22, 2019.

(51) Int. Cl.
*F16B 37/04* (2006.01)
*F16B 23/00* (2006.01)
*F16B 37/06* (2006.01)

(52) U.S. Cl.
CPC ........ *F16B 23/003* (2013.01); *F16B 23/0015* (2013.01); *F16B 23/0038* (2013.01); *F16B 37/04* (2013.01); *F16B 37/068* (2013.01); *F16B 37/045* (2013.01); *F16B 37/062* (2013.01)

(58) Field of Classification Search
CPC .... F16B 37/068; F16B 37/048; F16B 35/048; F16B 37/00; F16B 4/004
USPC .................................. 411/180, 338–339, 427
See application file for complete search history.

(56) References Cited

U.S. PATENT DOCUMENTS

| | | | | |
|---|---|---|---|---|
| 1,873,894 | A * | 8/1932 | Kimbell | F16B 37/048 411/968 |
| 2,026,757 | A * | 1/1936 | Swanstrom | F16B 37/065 411/181 |
| 3,008,552 | A * | 11/1961 | Bushman | F16B 5/01 411/965 |
| 3,358,727 | A * | 12/1967 | Hughes | B61D 17/043 411/968 |
| 3,370,631 | A * | 2/1968 | James | F16B 35/065 411/959 |
| 3,403,718 | A * | 10/1968 | Hughes | F16B 37/048 411/968 |
| 3,434,521 | A * | 3/1969 | Flora | F16B 5/06 411/968 |
| 4,448,565 | A * | 5/1984 | Peterson | F16B 37/048 403/408.1 |
| 11,098,747 | B2 * | 8/2021 | Zimmerman | F16B 15/06 |

(Continued)

*Primary Examiner* — Flemming Saether
(74) *Attorney, Agent, or Firm* — Intellectual Property Consulting, LLC; Stephen M. Kepper; Jared K. Rovira

(57) ABSTRACT

A T-Nut comprising a tubular body attached to a flanged head is provided. The tubular body includes a bottom portion of constant diameter and an upper neck portion with a neck diameter that gradually increases as it approaches the flange head. Additionally, the bottom surface of flange head of the T-Nut may be recessed inwardly towards the top surface of the flange head to create circumferential concave cavity underneath the flange head, which will allow the flange head to envelope any portions of a washer or casing that may be above the surface of the material being joined.

3 Claims, 11 Drawing Sheets

(56) References Cited

U.S. PATENT DOCUMENTS

2003/0143057 A1* 7/2003 Shinjo ................ F16B 25/0021
411/387.1
2006/0140737 A1* 6/2006 Nagayama ............ F16B 37/048
411/180

* cited by examiner

T-NUT

RELATED APPLICATIONS

This application claims priority to U.S. Provisional Application No. 62/876,823 filed Jul. 22, 2019. The entire contents of the above application are hereby incorporated by reference as though fully set forth herein.

FIELD

The present invention relates to the field of fastening devices. More specifically, the present invention relates to a T-Nut fastener.

BACKGROUND

A T-Nut is a type of fastener used to connect a component to a given material, such as wood, plastic, cloth, fabric, or other composite material. The T-Nut gets its name from its shape, which consists largely of a threaded barrel with a flange head at one end, resembling a "T" in profile. T-Nuts are a preferred fastener in the tactical gear industry for the smooth finish it leaves when two surfaces are joined together.

Generally, there is a pre-fabricated hole slightly bigger than the diameter of the T-Nut barrel drilled into the surfaces to be joined. As the mating screw or bolt is threaded into the T-Nut, the surfaces are securely joined. When plastic or other materials are joined, the hole may be lined with a cylindrical casing with open ends and rounded edges that slightly protrude from the surface of the material to be joined. Due to the rounded edges, the T-Nut is unable to sit flush with the surface of the material. Additionally, since the barrels of existing T-Nut's are of constant diameter, they are prone to oscillating up and down within the pre-drilled hole or casing, which will inevitably lead to further loosening of the T-Nut from its mating screw and a less secure connection.

Accordingly, there is a need for a T-Nut whose shape is adapted to be fed easily through a given casing or hole and fit securely within said casing or hole in order to prevent oscillation. Optionally, the T-Nut may have a flange head with a recessed bottom surface that is adapted to fully envelope a typical cylindrical plastic casing and sit flush on the surface of the material.

BRIEF SUMMARY OF INVENTION

The present invention seeks to meet these needs by providing a T-Nut comprising a tubular body having a bottom portion of constant diameter and an upper neck portion with an outer diameter that gradually increases as it approaches the flange head. As the mating fastener is tightened, the T-Nut is pulled into the drill-hole or casing, and the upper neck portion of the tubular body cinches against the inner surface of the hole/casing, providing a more secure fitting and reducing the likelihood of any vertical oscillation. Additionally, the bottom surface of flange head of the T-Nut may be recessed inwardly towards the top surface of the flange head to create a circumferential concave cavity underneath the flange head, which will allow the flange head to envelope any portions of a washer or casing that may be above the surface of the material being joined.

DETAILED DESCRIPTION

Figure 1:
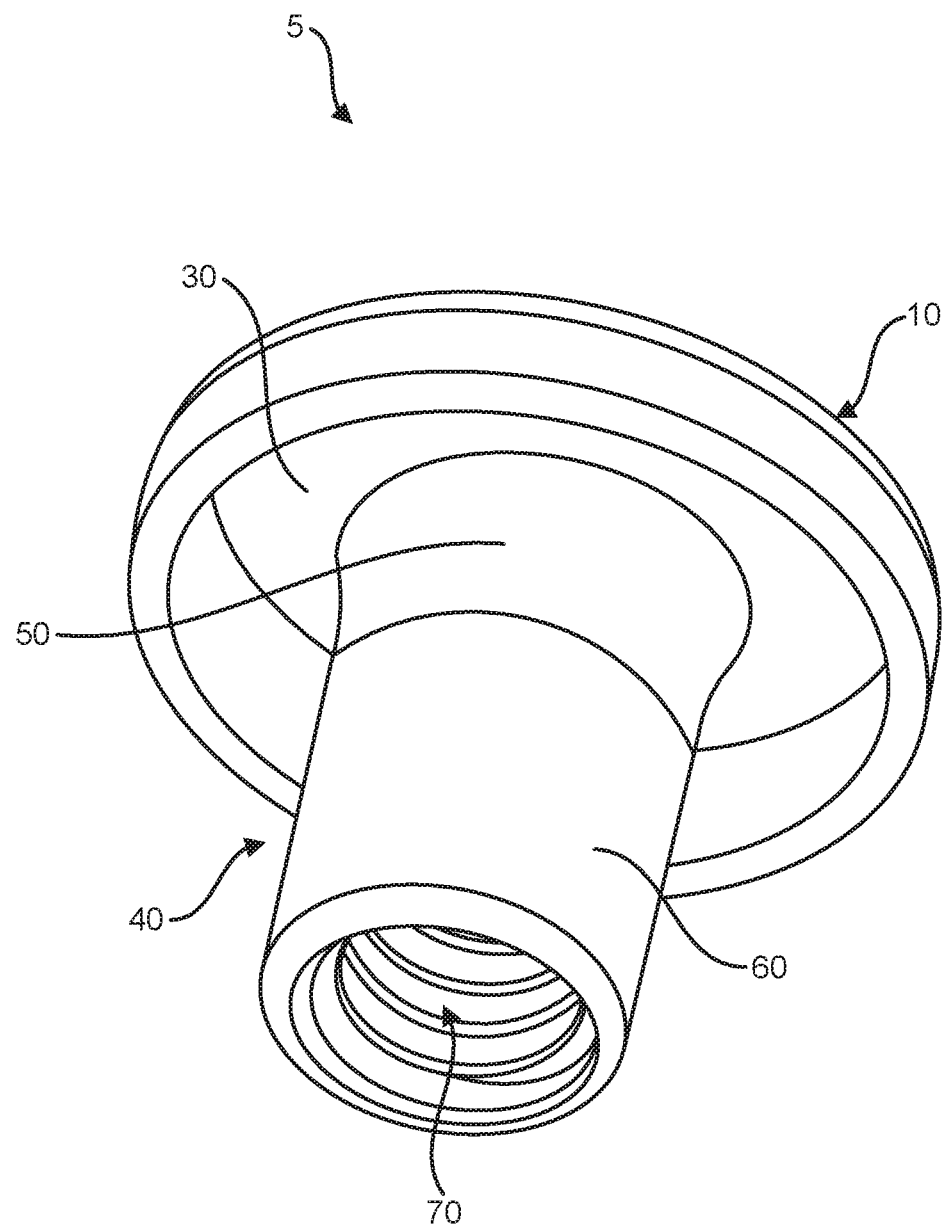
FIG. 1 is a perspective view of the preferred embodiment of the invention.
Figure 2:
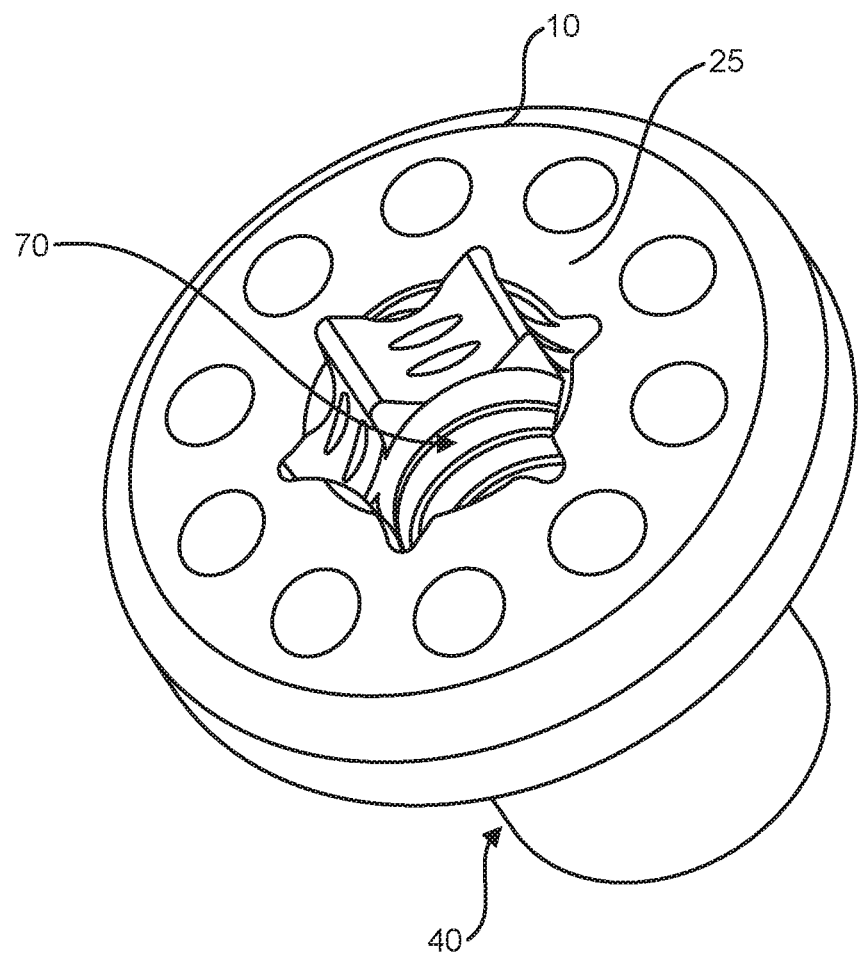
FIG. 2 is an alternative perspective view of the preferred embodiment of the invention.
Figure 5:
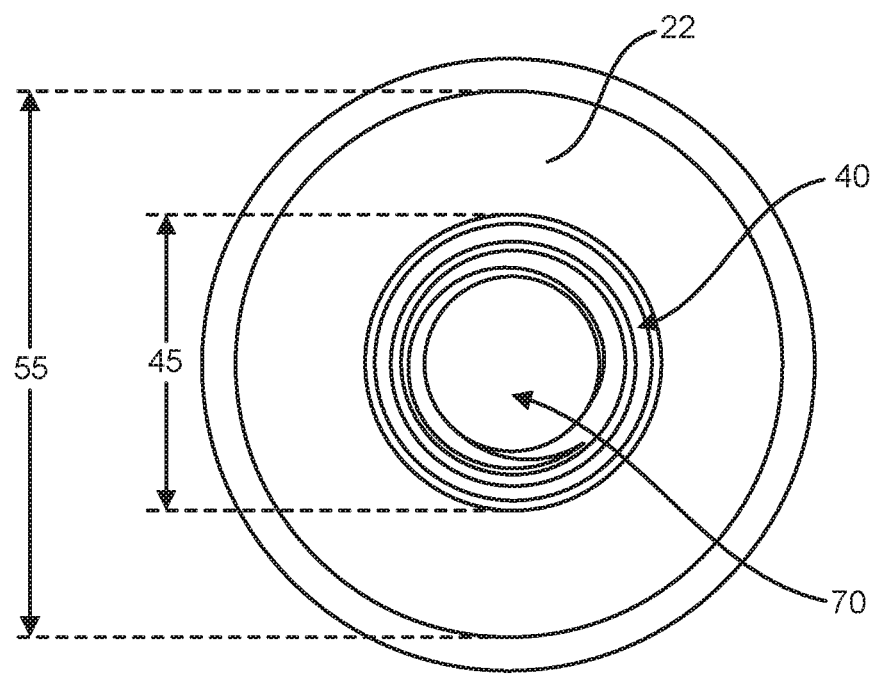
FIG. 5 is a bottom view of the preferred embodiment of the invention.
Figure 9:
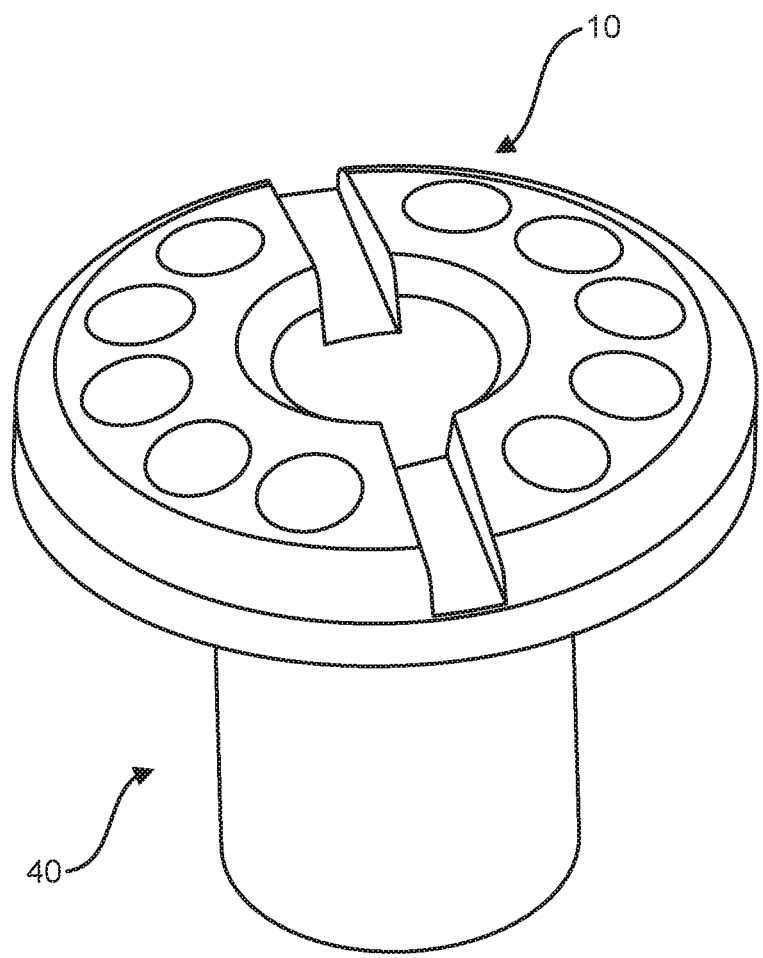
FIG. 9 is a perspective view of an alternative embodiment of the invention showing a head with an alternative configuration.
Figure 10:
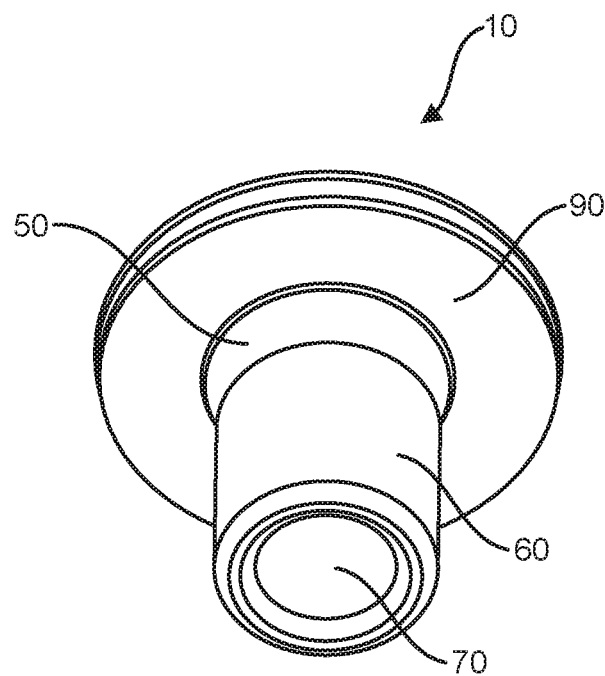
FIG. 10 includes separate perspective views of an of an alternative embodiment of the invention showing a head with a substantially flat bottom surface.
Figure 10:
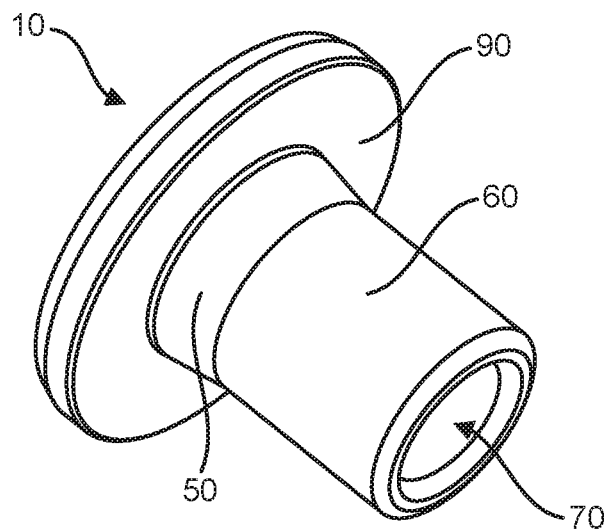

Turning to FIGS. 1-2, alternative perspective views of the of the T-Nut 5 are shown. The T-Nut 5 includes a flanged head 10 attached to a tubular body 40 with an interior bore 70 extending along a portion of the length of the tubular body 40. As shown in FIGS. 3-6, the preferred embodiment of the flanged head 10 has a top surface 25 and bottom surface 30. In FIG. 5, the bottom surface 30 is further defined by an inside diameter 45 and an outside diameter 55 where the bottom surface 30 is substantially recessed 22 inward towards the top surface 25 between the inside diameter 45 and outside diameter 55 resulting in an "umbrella" shaped flanged head 10. However, it is anticipated that the flanged head 10 may come in various shapes and sizes. For example, as shown in FIG. 10, the flanged head 10 may have a flat bottom surface 90 as opposed to a recess 22. Additionally, the top surface 25 of the head portion 10 shown is configured to accommodate a typical TORX wrench, but may be adapted to accommodate any type of fastening tool known in the art, including a hex wrench (as shown in FIG. 2), screwdriver (as shown in FIG. 9), or other fastening drive system.

Figure 6:
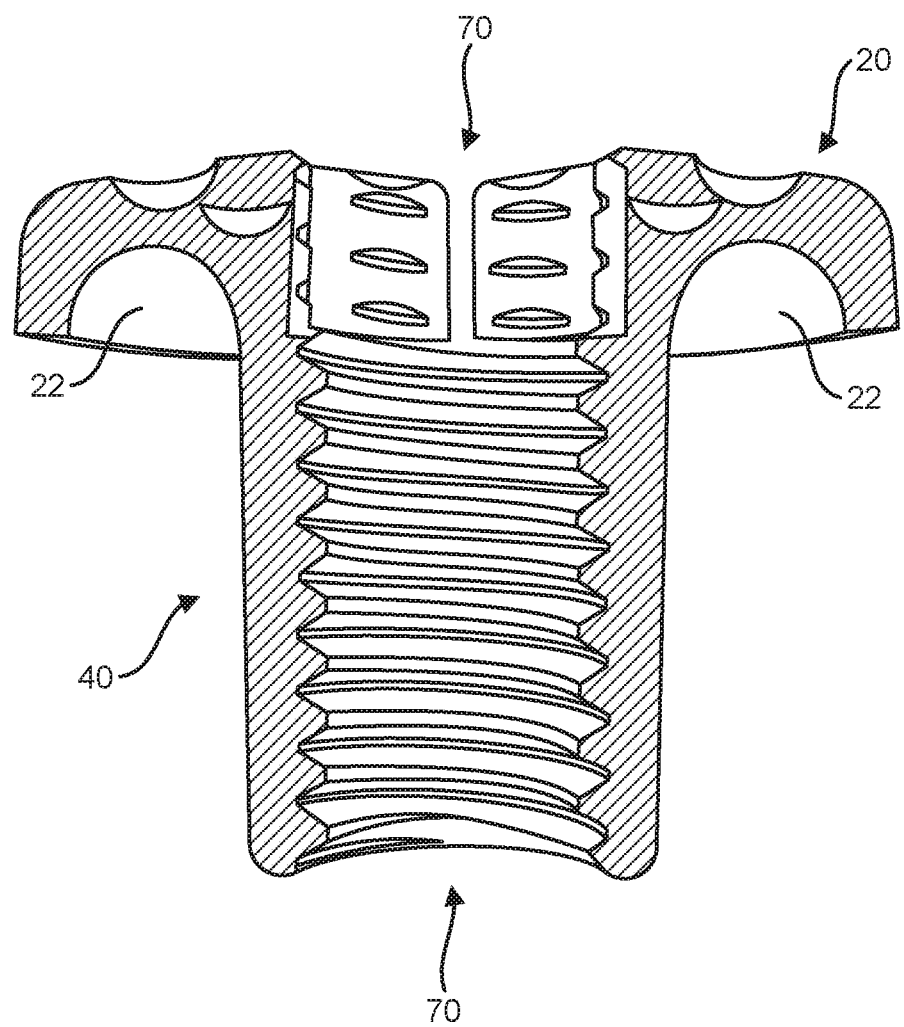
FIG. 6 is a cross-sectional side view of the preferred embodiment of the invention.
Figure 7:
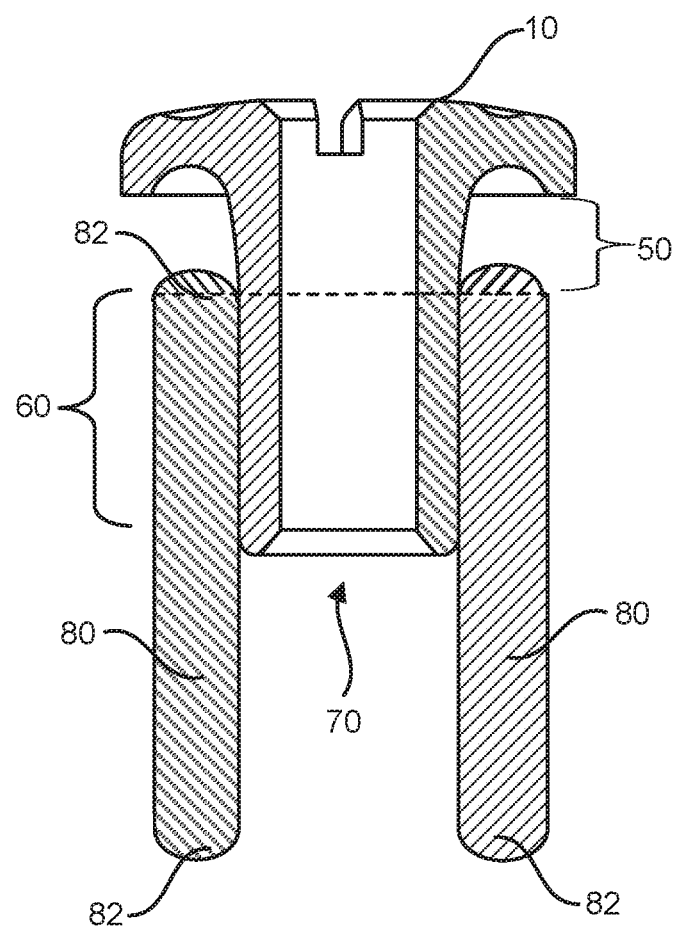
FIG. 7 is a cross sectional side view of the preferred embodiment of the invention partially inserted into a drill-hole or casing.
Figure 8:
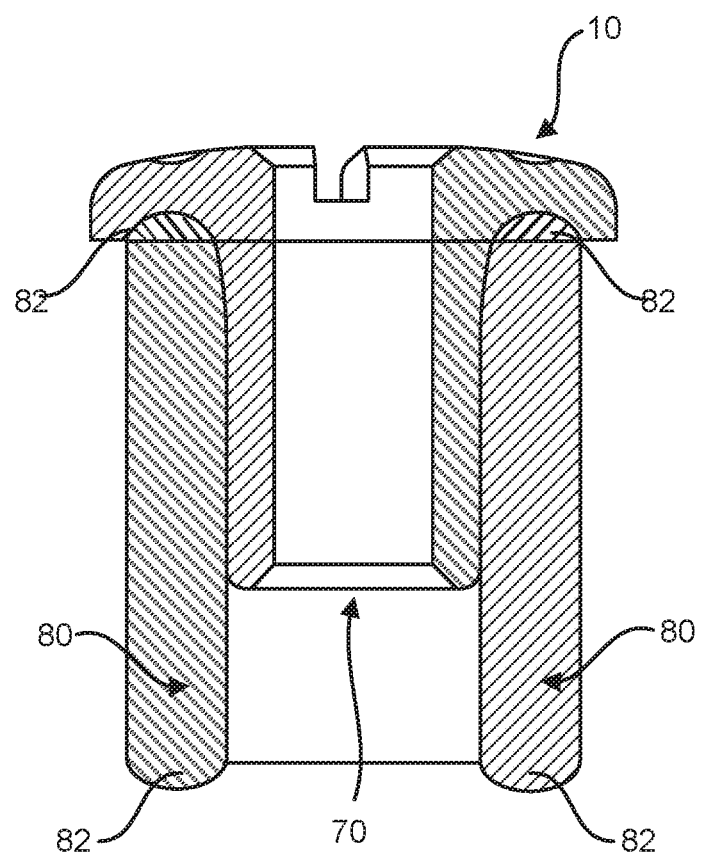
FIG. 8 is a cross sectional side view of the preferred embodiment of the invention fully inserted into a drill-hole or casing, such that the tapered neck is fully engaged with the walls of the hole or casing.

In application, the T-Nut generally fits into a hole or casing 80 (as shown in FIGS. 7-8) that has been drilled or pre-fabricated between at least two surfaces to be joined. As the mating screw or bolt (not shown) is threaded into the bore 70 of the T-Nut, the surfaces are securely joined. In the tactical gear industry, T-Nuts often fit within cylindrical plastic casings—or eye-let type rivets made from brass, steel, or other metals—having rounded edges 82 that protrude slightly from the surface of the material to be joined. Such protrusions are susceptible to being caught on some external object and can cause damage to the thing being secured with the T-Nut. To address this problem, the flanged head 10 includes a recessed 22 interior bottom surface 30 that will envelope the protrusions of the casing to allow the head 10 to sit flush on the material surface being joined. The recess 22 has a generally semi-circular cross section (as shown in FIGS. 6-8).

Figure 3:
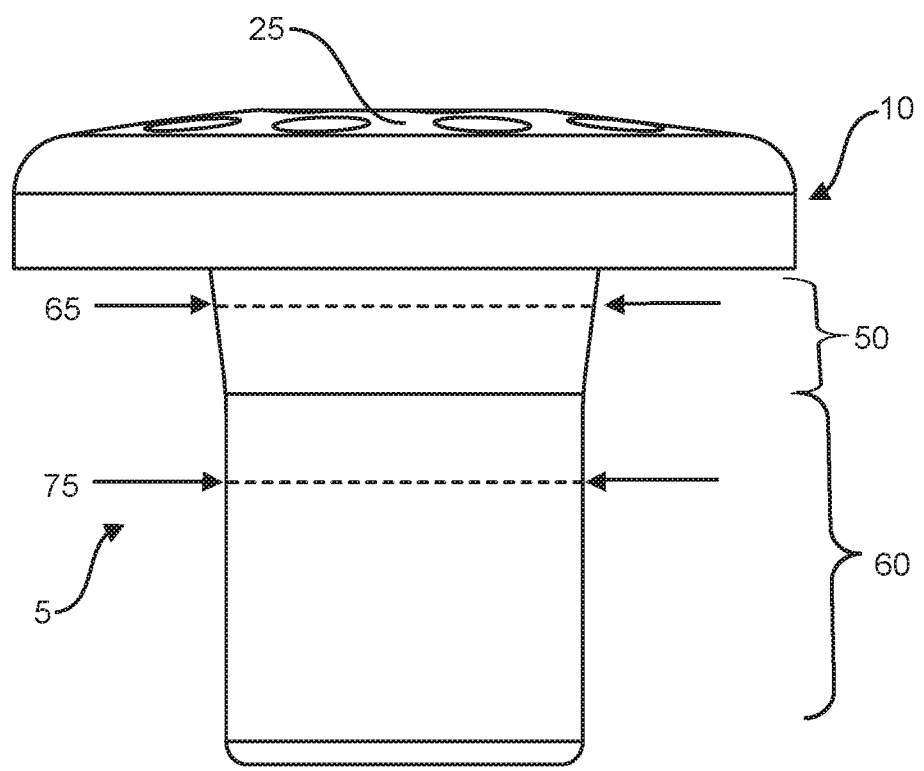
FIG. 3 is a side profile view of the preferred embodiment of the invention.
Figure 4:
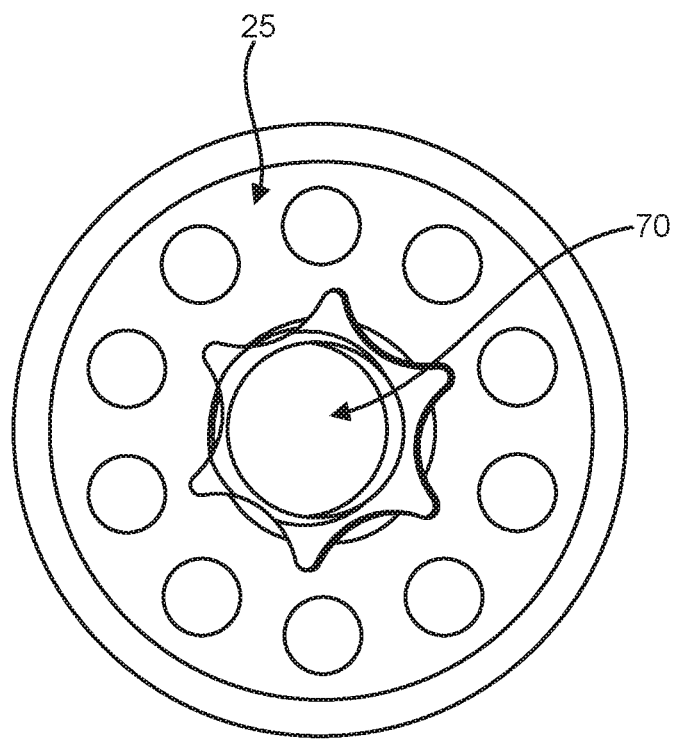
FIG. 4 is a top view of the preferred embodiment of the invention.

Turning to FIGS. 1, 3, and 6, the tubular body 40 of the T-Nut is shown and extends axially from the inside diameter 45 (shown in FIG. 5) of the bottom surface 30 of the flanged head 10; the tubular body 40 includes a top neck portion 50 with a neck diameter 65 and a bottom portion 60 with a bottom diameter 75. The bottom diameter 75 remains constant for the length of the bottom portion 60, and is sized and dimensioned to fit within a pre-drilled hole or casing 80 (as shown in FIGS. 7-8). The neck diameter 65 gradually decreases as the neck portion 50 extends from the bottom surface 30 of the flanged head 10 to the bottom portion 60 of the tubular body 40. Further, it is envisioned that the bore 70 within the tubular body 40 be threaded to accommodate a mating screw or bolt, although any other fastening means known in the art could be utilized.

An additional focus of this invention is to create a more secure fitting between the T-Nut and the surfaces to be joined. Turning to FIG. 7, a T-Nut partially inserted into an example casing/hole 80 of relative constant diameter is shown. When the mating bolt or screw (not shown) is tightened, the T-Nut tubular body 40 is forcefully pulled into the pre-fabricated hole or casing 80. As the neck portion 50 is forced through the prefabricated hole or casing 80, the gradual increase of the neck diameter 65 creates an "interference fit" between the neck portion 50 portion of the tubular body 40 and the inside of the hole/casing 80, locking the T-Nut in place, as shown in FIG. 8. The configuration of the neck portion 50 has several benefits, including: (i) allowing the T-Nut assembly to be re-tensioned without negative effects on the overall fastening assembly, (ii) allowing for easier detachment of the T-Nut, and (iii) providing a self-centering mechanism as the T-Nut is pulled through the corresponding mating fastener.

The taper ratio of the neck portion 50 is determined by subtracting the smallest neck diameter (also the bottom diameter 45) from the largest neck diameter (also the inside diameter 55 of the bottom surface 30) and dividing the difference by the length of the neck portion 50. The taper ratio determines how difficult it may be to remove the T-Nut from the mating fastener, e.g. a rivet or plastic casing. A taper ratio of 20% (i.e. 1:5), which as demonstrated in FIG. 11, corresponds to an exemplary embodiment of the invention, indicates a connection that is secure but more readily detachable. As the taper ratio decreases, the less difficult it becomes to detach the T-Nut.

Figure 11:
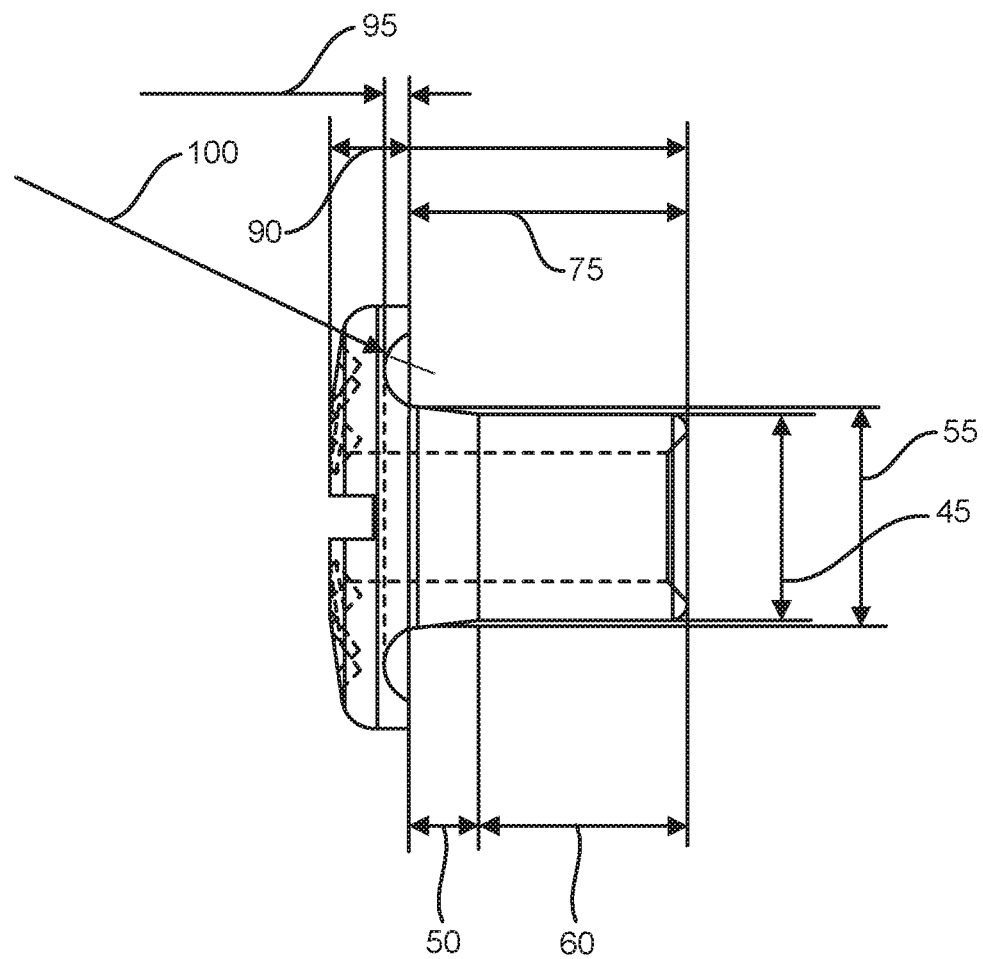
FIG. 11 includes a side view of an exemplary embodiment of the invention.

Turning to FIG. 11, an exemplary embodiment of the T-Nut 5 is shown. The inside diameter 55 of the bottom surface 30 is 0.2338 inches and the bottom diameter 45 is 0.2180 inches. The length of the tubular body 75 is 0.3000 inches with the length of the neck portion 50 being 0.075 inches and the length of the bottom portion 60 being 0.2250 inches. The width of the flange head 90 is 0.0812 inches and the recessed length 95 on the bottom surface 30 of the flanged head 10 is 0.0250 inches based on a recessed radius 100 of 0.0408 inches.

For the purposes of promoting and understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical." Numerous modifications and adaptations will be readily apparent to those skilled in this art without departing from the spirit and scope of the present invention.

What is claimed is:

1. A T-Nut comprising:
   a flanged head with a top surface and a bottom surface, the bottom surface having an outside diameter and inside diameter,
      wherein a portion of the of the bottom surface between the inside diameter and outer diameter is recessed inward towards the top surface, and wherein said recessed portion has a generally semi-circular cross-section; and
   a tubular body with a bore disposed within the tubular body that is operable to receive a mating fastener, wherein the tubular body extends axially from the inside diameter of the bottom surface of the flanged head such that the tubular body and the flanged head form a single contiguous body.
      wherein the tubular body further comprises a neck portion proximal to the bottom surface of the flanged head having a neck diameter, and a bottom portion distal to the bottom surface of the flanged head having a constant bottom diameter,
      wherein the bottom diameter is less than the inside diameter of bottom surface of the flanged head, and wherein the neck diameter gradually decreases as the neck portion extends towards the bottom portion.

2. The T-Nut of claim 1, wherein the bore within the tubular body is threaded.

3. The T-Nut of claim 1, wherein the top surface of the head is operable to receive any tools selected from the group comprising: a TORX wrench, a hex wrench, or a screwdriver.

* * * * *